CONDENSED PHOSPHORIC ACID HAVING REDUCED VISCOSITY

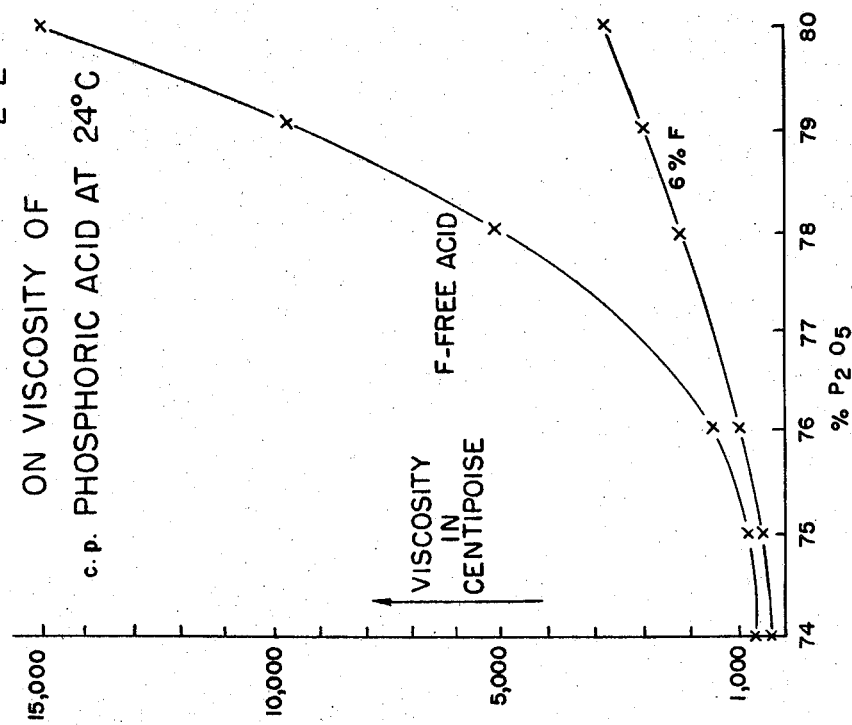
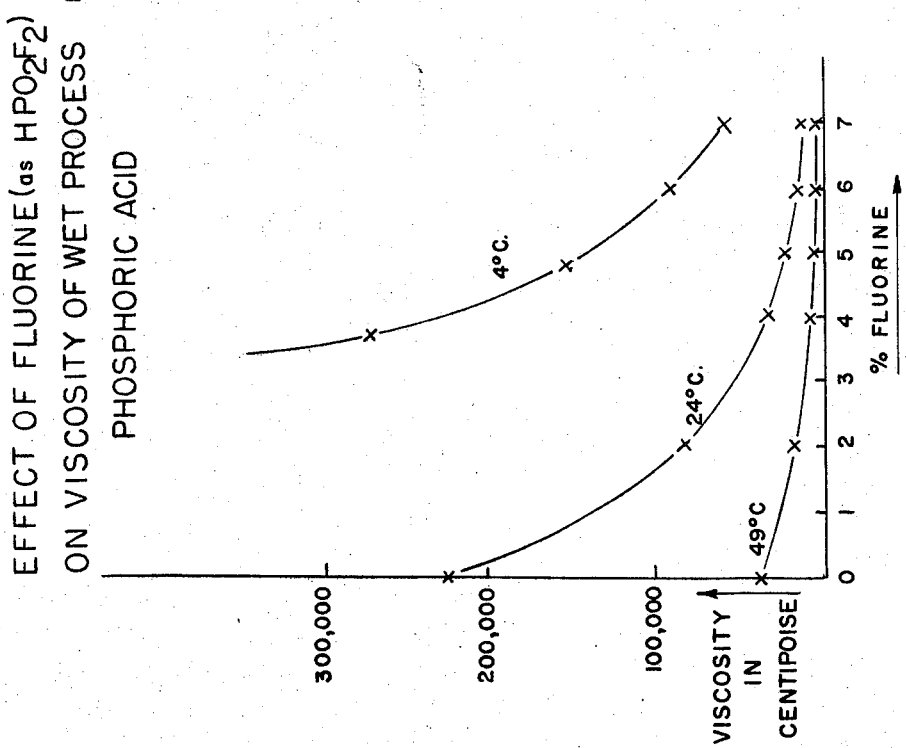
INVENTORS:
ROBERT A. WIESBOECK
CHARLES C. STONE
BY: Carl C. Batz
ATT'Y

Robert A. Wiesboeck, Atlanta, and Charles C. Stone, Doraville, Ga., assignors to United States Steel Corporation, Pittsburgh, Pa.
Filed June 28, 1968, Ser. No. 740,918
Int. Cl. C01b 25/24
U.S. Cl. 23—165      7 Claims

ABSTRACT OF THE DISCLOSURE

To reduce the viscosity of condensed phosphoric acids so that they can be pumped or otherwise readily handled or treated, the F content of the acids is raised above two percent and preferably above four percent. The fluorine may be added in the form of a fluorine-containing compound, such as fluorophosphoric acid, difluorophosphoric acid, hexafluorophosphoric acid, hydrogen fluoride, etc. The fluorine treatment inhibits crystallization of the acid and, in the case of wet process phosphoric acid containing solids, dissolves solids in the acids.

BACKGROUND AND SUMMARY

The viscosity of phosphoric acids increases with increasing $P_2O_5$ content. Acids containing more than 70% $P_2O_5$ present problems in handling due to their high viscosity at lower temperatures. This is particularly true for wet process acids which usually contain suspended solids as well as dissolved impurities, resulting in an even higher viscosity. There is further a problem of crystallization of the acids on standing. If the highly-viscous acids could be rendered pumpable and if crystallization of the condensed phosphoric acids could be inhibited, a substantial advance in the art would be made.

We have discovered that by the addition of relatively small quantities of fluorine to the condensed phosphoric acids, a substantial decrease in viscosity is produced, while also crystallization of the condensed phosphoric acids is inhibited. The fluoride may be added in the form of a fluorine-containing compound, including fluorophosphoric acid, difluorophosphoric acid, hexafluorophosphoric acid, hydrogen fluoride, and similar compounds. The decrease in viscosity is particularly evident at high $P_2O_5$ levels and at low temperatures; i.e., under conditions where a reduction of the viscosity is most desirable.

DRAWING

In the accompanying drawing, FIG. 1 is a graph showing the effect of fluoride on wet process phosphoric acid; and FIG. 2, a similar graph showing the effect of fluorine on the viscosity of chemically pure phosphoric acid.

DETAILED DESCRIPTION

Condensed phosphoric acid, such as, for example, phosphoric acid containing 65 weight percent $P_2O_5$ and above, is treated with fluorine, preferably by the adding thereto of a fluorine-containing compound to bring the F content in the range of between 2–10 percent or above and preferably in the range of about 4–6 percent. A greater amount of fluoride is required for the condensed acid when the same is maintained at low temperatures, such as down to about 0° C.

The effect of fluoride on the viscosity of condensed phosphoric acids is due to the formation of fluorophosphoric acids which are in equilibrium with each other and free hydrogen fluoride:

$$HPO_2F_2 + H_3PO_4 \rightleftharpoons 2H_2PO_3F$$
$$H_2PO_3F + H_2O \rightleftharpoons H_3PO_4 + HF$$

It is therefore immaterial in which form the fluoride is introduced. However, the addition as hydrogen fluoride will cause the formation of water and therefore lower the $P_2O_5$ concentration. Mono- and difluorophosphoric acid, on the other hand, hardly affect the $P_2O_5$ level of phosphoric acid.

The principle of the viscosity effect is based on the lower association and interaction (hydrogen bonding and difference in acid strength) of the fluorophosphoric acids as compared to their fluorine-free counterparts. This phenomenon is also reflected in the melting points of the pure acids, as shown in Table I.

Table I.—Melting points of phosphoric acids

| Acid: | Melting point, ° C. |
| --- | --- |
| Pyrophosphoric, $H_4P_2O_7$ | 54.3, 71.5 (Modif. I and II). |
| Orthophosphoric, $H_3PO_4$ | 42.3. |
| Fluorophosphoric, $H_2PO_3F$ | −78 (rigid glass). |
| Difluorophosphoric, $HPO_2F_2$ | −96.5. |

A contributing factor to the reduction in viscosity by fluoride may be the shift in phosphate distribution to species of lower viscosity, i.e., a shift to the left in the following series:

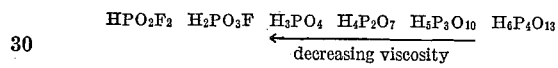

decreasing viscosity

It seems quite possible that the fluoride also enters the polyphosphate distribution, forming fluorinated polyphosphoric acids, at the higher $P_2O_5$ levels.

In the case of wet process acids containing suspended solids and dissolved impurities, the degree of viscosity reduction by fluoride is considerably greater than with c.p. acid of comparable $P_2O_5$ content. Consequently, the added fluoride must also affect solids and/or dissolved impurities of wet process acids in a desirable way.

Due to the equilibrium, the viscosity of freshly-prepared samples approaches a constant value only after storage for several days or sometimes weeks, depending on storage temperature and acid concentrations. Typically the viscosity of acids treated with hydrogen fluoride will decrease gradually until the equilibrium is reached. By contrast, difluorophosphoric produces initially a greater reduction in viscosity which subsequently increases until the equilibrium value is attained.

An additional benefit of the fluoride treatment of condensed phosphoric acids is the inhibition of crystallization of such acids. Although the crystallization is not always prevented, it is usually delayed for several months.

Specific examples illustrative of the invention may be set out as follows:

EXAMPLE I

Wet process condensed phosphoric acid was treated with calculated amounts of difluorophosphoric acid to obtain a fluoride content of 2, 4, 5, 6 and 7% at a constant $P_2O_5$ (71.5%) level. As shown in FIG. 1 of the drawing, all fluoride-treated acids decreased in viscosity. The reduction was strongest at 0° C. where the viscosity decreased from 3 million cp. for the fluoride free sample to 278,000, 155,000, 90,000 and 53,000 cp. at 4, 5, 6 and 7% fluoride, respectively. A similar but smaller reduction in viscosity was found at 24 and 49° C. (FIG. 1).

EXAMPLE II

The viscosity-reducing effect of fluoride becomes stronger at higher $P_2O_5$ levels. Viscosities (cp.) of chemically pure polyphosphoric acid with $P_2O_5$ contents between 74 and 80% at a constant fluoride concentration of 6% were determined. The data showed a reduction in viscosity at 24° C. from 550 cp. (fluoride free) to 320 cps. at 74% $P_2O_5$ and from 15,000 cp. to 4,100 cp. at 80% $P_2O_5$. The results are shown graphically in FIG. 2.

EXAMPLE III

Table II demonstrates the change in viscosity of chemically pure 77% $P_2O_5$ acid containing 4% fluorine derived from hydrogen fluoride in one case and from difluorophosphoric acid in the other.

TABLE II

Storage effect on viscosity of chemically pure polyphosphoric acid (77% $P_2O_5$, 4% F.)]

| F-source | Viscosity, Cp. at 24° C. initially | after 4 weeks |
|---|---|---|
| Hydrogen fluoride | 2,500 | 2,460 |
| Difluorophosphoric acid | 1,850 | 2,190 |
| Fluoride-free acid | 2,900 | Crystallized |

The fluoride-free phosphoric acid (77% $P_2O_5$) listed in Table II began to crystallize several days after preparation and was completely solidified at the end of one month. By contrast, the corresponding acids containing 4% fluoride derived from hydrogen fluoride or difluorophosphoric acid showed no signs of crystallization.

While in the foregoing specification we have described procedure and products in considerable detail for the purpose of illustrating embodiments of the invention, it will be understood that such details may be varied widely by those skilled in the art without departing from the spirit of our invention.

What is claimed is:

1. In a process for treating condensed phosphoric acid to reduce the viscosity thereof, the steps of mixing with phosphoric acid having a $P_2O_5$ content in excess of 65 weight percent, fluorophosphoric acid, difluorophosphoric acid, hexafluorophosphoric acid, or hydrogen fluoride to bring the fluorine content of the acid in excess of two percent by weight.

2. The process of claim 1 in which the fluorine content is in excess of four percent.

3. The process of claim 1 in which said condensed phosphoric acid is wet process phosphoric acid.

4. In a process for treating condensed wet process phosphoric acid having a $P_2O_5$ content in excess of 65 weight percent containing solids, the steps of mixing with the wet process phosphoric acid, fluorophosphoric acid, difluorophosphoric acid, hexafluorophosphoric acid, or hydrogen fluoride to bring the fluorine content of the acid in the range of 2–10 percent by weight.

5. The process of claim 4 in which the fluorine content is raised to about 4–6 weight percent.

6. Condensed phosphoric acid of decreased viscosity having a $P_2O_5$ content in excess of 65 weight percent and fluorine content in the range of 2–10 weight percent, said fluorine being present as a fluorophosphoric acid or hydrogen fluoride.

7. The product of claim 6 in which the phosphoric acid is wet process phosphoric acid.

References Cited

UNITED STATES PATENTS 3,457,036  7/1969  Backlund _____ 23—165

OSCAR R. VERTIZ, Primary Examiner

G. A. HELLER, Assistant Examiner